US008001002B2

(12) United States Patent
Buiten et al.

(10) Patent No.: US 8,001,002 B2
(45) Date of Patent: Aug. 16, 2011

(54) INTERACTIVELY PRESENTING ADVERTISING CONTENT OFFLINE

(75) Inventors: Todd Buiten, Kent, WA (US); Phani K Vaddadi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 11/851,655

(22) Filed: Sep. 7, 2007

(65) Prior Publication Data

US 2009/0070186 A1 Mar. 12, 2009

(51) Int. Cl.
*G06Q 30/00* (2006.01)
(52) U.S. Cl. .................................. 705/14.49; 705/14.55
(58) Field of Classification Search ............... 705/14.48, 705/14.55
See application file for complete search history.

(56) References Cited

U.S. PATENT DOCUMENTS

| 5,721,827 | A  | * | 2/1998 | Logan et al. ........................ 709/217 |
| 5,732,216 | A  | * | 3/1998 | Logan et al. ........................ 709/203 |
| 5,774,170 | A  | * | 6/1998 | Hite et al. ............................. 725/34 |
| 5,926,624 | A  | * | 7/1999 | Katz et al. ........................... 709/217 |
| 6,055,566 | A  | * | 4/2000 | Kikinis ................................. 709/219 |
| 6,282,713 | B1 | * | 8/2001 | Kitsukawa et al. .................. 725/36 |
| 6,351,736 | B1 | * | 2/2002 | Weisberg et al. ............. 705/14.46 |
| 6,463,468 | B1 | * | 10/2002 | Buch et al. ......................... 709/219 |
| 7,027,801 | B1 |   | 4/2006 | Hall et al. |
| 7,103,370 | B1 |   | 9/2006 | Creemer |
| 7,206,748 | B1 | * | 4/2007 | Gruse et al. ......................... 705/51 |
| 7,412,484 | B1 | * | 8/2008 | Kikinis ................................. 709/206 |
| 7,509,178 | B2 | * | 3/2009 | Logan et al. ........................ 700/94 |
| 7,568,213 | B2 | * | 7/2009 | Carhart et al. ....................... 725/86 |
| 2001/0018340 | A1 |   | 8/2001 | Tagi |
| 2002/0169540 | A1 | * | 11/2002 | Engstrom .............................. 701/200 |
| 2003/0046162 | A1 |   | 3/2003 | Nestel |
| 2003/0110130 | A1 | * | 6/2003 | Pelletier ................................ 705/50 |
| 2003/0110499 | A1 |   | 6/2003 | Knudson et al. |
| 2003/0135853 | A1 | * | 7/2003 | Goldman et al. ................... 725/34 |
| 2006/0092966 | A1 | * | 5/2006 | Sitnik et al. ........................ 370/463 |
| 2006/0107302 | A1 |   | 5/2006 | Zdepski |
| 2007/0073436 | A1 |   | 3/2007 | Sham |
| 2007/0124201 | A1 |   | 5/2007 | Hu et al. |
| 2007/0294773 | A1 | * | 12/2007 | Hydrie et al. ....................... 726/27 |
| 2008/0040768 | A1 | * | 2/2008 | Robotham ......................... 725/132 |

FOREIGN PATENT DOCUMENTS

| WO | WO2005086969      |    | 9/2005 |
| WO | WO 2005086969 A2  | *  | 9/2005 |
| WO | WO2006136109      |    | 12/2006 |

OTHER PUBLICATIONS

"Mobile Billboards & Outdoor Mobile Advertising", http://www.citi-mobile.com/, Jun. 8, 2007, pp. 1-3.
"Captivate Network", http://www.captivate.com/mediakit/Captivate_Overview_Brochure.
"Interactive Wireless Electronic Billboard", http://ieeexplore.ieee.org/Xplore/login.jsp?url=ie15/9086/28846/01297499.

\* cited by examiner

*Primary Examiner* — Traci L Casler
(74) *Attorney, Agent, or Firm* — Shook, Hardy & Bacon L.L.P.

(57) ABSTRACT

Methods, media, and components are provided for presenting advertising content in an offline setting. In one embodiment, the method includes presenting on a user interface (UI) an advertisement in an electronic form that is associated with selectable options that are also presented on the UI. The selectable options lead to a presentation of supplemental advertising information that is related to the advertisement. The method also includes receiving user input via one the selectable options, and while not communicatively coupled to a source-delivery network, presenting supplemental advertising information that is related to the advertisement.

10 Claims, 14 Drawing Sheets

INTERACTIVELY PRESENTING ADVERTISING CONTENT OFFLINE

SUMMARY

Embodiments of the present invention are defined by the claims below, not this summary. Described herein is a device, method, and media that facilitates presenting advertising content to users in an interactive setting. Users can interact with the device when it is in an offline state. Being offline, it does not need to rely on persistent internet or other connections and is always ready to present information (advertising content, media content, etc.). By allowing interaction with users, the device can tailor what ads are presented based on the interactions (buttons selected, information sought, etc.). User interactions are tracked and periodically uploaded to a remote location (e.g., a server that can deliver more content, or interested vendors). Accordingly, embodiments of the instant invention have several practical applications in the technical arts, including (among other things) providing immediate access to advertising content irrespective of the location of the presentation device, tailoring advertisements and media content based on user interactions, enabling sharing of the advertisement content with nearby devices, and enabling remote gathering of interaction data, which can be used for a variety of purposes, such as providing a basis to deliver specific additional advertising data, and setting pricing information associated with presenting the advertising content.

BRIEF DESCRIPTION OF THE SEVERAL VIEWS OF THE DRAWINGS

Embodiments of the invention are described in detail below with reference to the drawing figures, which form a part of this discourse, and are incorporated by reference herein, and wherein.

DETAILED DESCRIPTION

Illustrative aspects of the invention will be described in greater detail below. Listing some aspects should not be construed as an indication that other aspects do not exist. But a select listing is provided for illustrative purposes.

An embodiment of the present invention takes the form of a presentation device that operates in a fixed location to present advertisement and other data in a self-contained format. That is, a presentation device does not present real time advertisement data from a remote site because it is not persistently connected to a communications network through which it would otherwise receive the content to present in real time. Rather, an aspect of the invention takes advantage of an interactive model of receiving feedback from users who interact with the device, whose feedback controls the presentation of various content, such as news, weather, sports, health, financial, and other information.

Figure 1A:
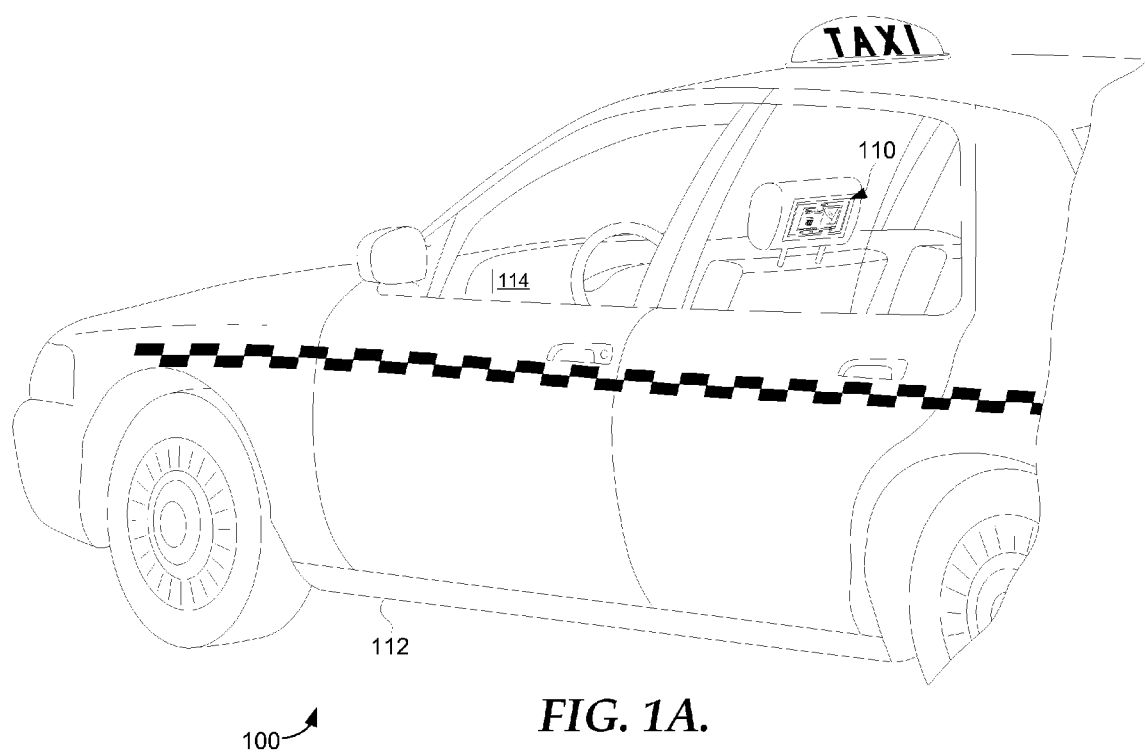
FIG. 1A depicts an illustrative use of an embodiment of a presentation device in connection with a public-transportation scenario according to an embodiment of the present invention.

As can be seen in FIG. 1A, a version of a display device is shown in a public-transportation environment, and referenced generally by the numeral 100. In this scenario, a taxi 112 provides a forum to fix presentation device 110 into the back of a headrest so that passengers can interact with the device. Presentation device 110 does not merely present stagnant content to users, as is the case in what some may refer to as "the elevator ride" scenario. Captivate Networks of Westford, Mass. offers products in this area. In such a case, a captive audience is merely the receiver of content that is presented in a unidirectional manner that does not include an ability to interact with the device. Here, user interactivity is both permitted and desired.

Figure 1B:
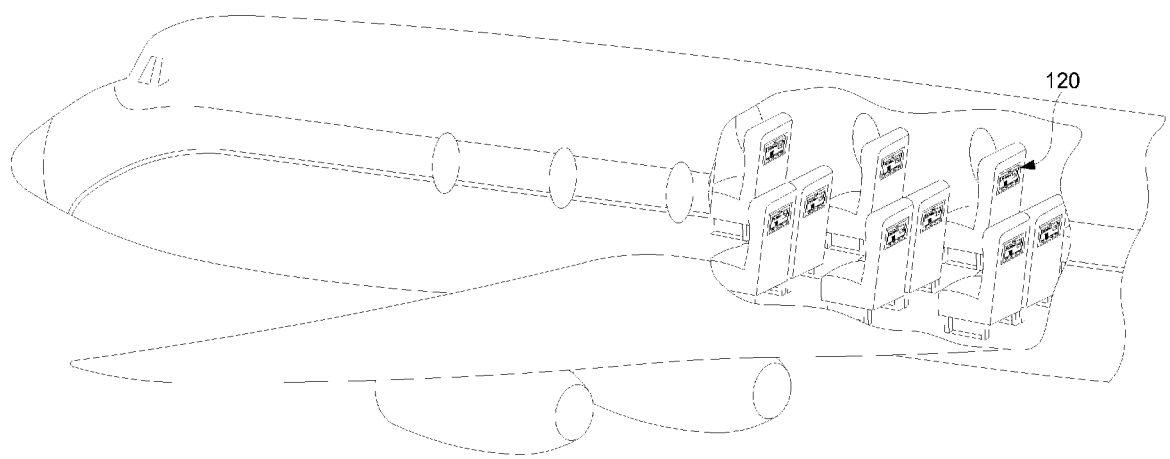
FIG. 1B depicts an illustrative use of the presentation device in connection with an air-travel scenario according to an embodiment of the present invention.

Turning to FIG. 1B, another variation of the presentation device 120 is shown as being integrated into the back of an airline seat. These two illustrations are meant to be illustrative in nature and to provide only two of a myriad of different environments in which presentation device 110 or 120 can operate.

Figure 2:
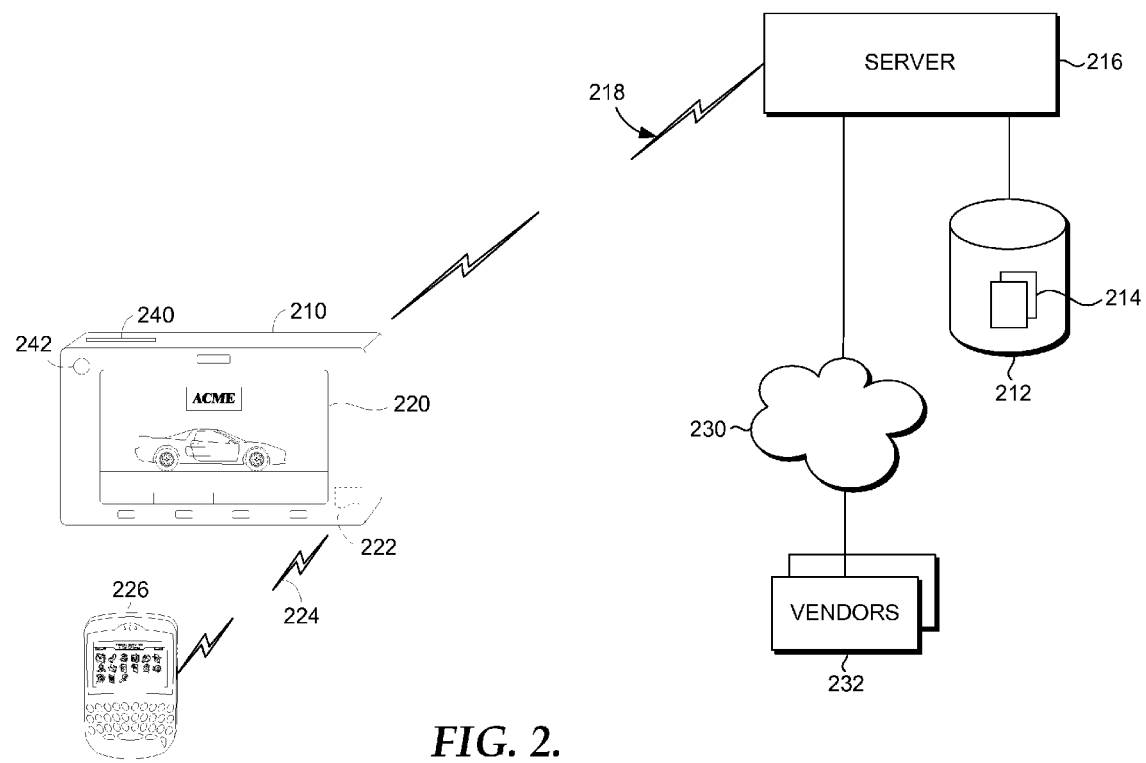
FIG. 2 is a block diagram that illustrates the presentation device's ability to periodically receive offline content but to communicate in real time with mobile devices.

Turning now to FIG. 2, a more general depiction of an embodiment of the present invention is provided. A presentation device 210 is shown. Presentation device 210 provides a new advertising surface that increases the likelihood of being able to reach an audience that is inaccessible by traditional advertising methods. Presentation device 210 is a self-contained advertising device that can combine various aspects of media to present content to users in an interactive way. Illustrative media include video, audio, textual, pictorial, and combinations of the same. These, of course, are not the only types of media that can be presented by presentation device 210, but are provided as a list of illustrative types of media.

Presentation device 210 allows a viewer to select content categories of interest. As mentioned, illustrative content categories include news, weather, sports, stocks, music, and the like. The advertising content can be customized to different settings as well as to different demographic traits of users. For example, in a doctor's waiting room, presentation device 210 may initially present advertising content related to common sicknesses such as the cold, the flu, sore throats, and the like. As will be explained in greater detail below, content categories can be created, and advertising can be further customized based on things such as seasons. In such an embodiment, "cold" and "flu" might be potential categories to choose from in the winter months, whereas "sunburns" and "allergies" might be options that can be selected during the summer months.

Presentation device 210 is installed in locations where people generally spend at least some time waiting, such as in taxi cabs, buses, airplanes, doctors' offices, and the like. As will be clear from this disclosure, presentation device 210 can also become part of a viewer's daily lifestyle. A resident of a certain city, for example, no longer will need to turn on a television to listen to the morning news and obtain a weather report prior to departing. Given an embodiment of the present invention, that same user could receive the daily weather report during a cab ride to the office. Although at first blush this sounds as though it might be similar to receiving content directly from a connected mobile device such as a smart phone or PDA, advantages are offered by embodiments of the present invention because it is always ready to go and to present content to a user. There is no waiting for the device to start up or for content to download. Moreover, presentation device 210 can function in environments where connected devices cannot; namely, any environment that presents issues associated with wirelessly receiving content from a distant source would not pose problems to presentation device 210; such environments would pose problems with mobile devices that rely on presenting data in real time.

The data that is presented on presentation device 210 is also different than the type of media that is presented in real time via a connected device. To accommodate its offline working environment, presentation device 210 includes content that is preassociated with other content that is presentable to a user based on the user interacting with the device. For example, a remote database 212 includes advertising content 214 that can be communicated through a server 216 to presentation device 210 by way of, for example, a wireless link 218. At least one novel aspect of the way that data is presented on presentation device 210 is the way in which it is stored.

Data can be stored in device 210 with predetermined associations so that as a user clicks through various content screens, certain other impressions are presented in a deliberate fashion. Thus, advertisement information 214 can be preassociated with other advertisement content before being communicated to device 210, or the information can be associated subsequent to downloading. In one embodiment, the preassociation of advertising or other media content relates general content to progressively more detailed or specific content.

Communications link 218 is a wireless communications link in one embodiment, but is not a persistent link by which advertisement data can be presented in real time through presentation device 210. Rather, communications link 218 is periodically established to provide advertisement content to presentation device 210, which then presents the advertisement content in an offline environment on a display such as display 220. In some embodiments, communications link 218 is established on a periodic basis, such as nightly or weekly so that presentation device 210 can receive at least a portion of advertisement content 214.

As will be explained in greater detail below, indications of user interaction with presentation device 210 can be recorded. In one embodiment, indicia of user interaction may be stored in a file such as file 222, which is shown as being a file or other data structure that is stored locally in presentation device 210. In some embodiments, the contents or the complete data structure 222 is communicated to server 216 by way of communications link 218 at the same time that communications link 218 is established to deliver advertisement content 214 to presentation device 210.

Presentation device 210 does include the capability to operate in highly localized, or personal area network ("PAN") environments. Thus, presentation device 210 can establish a short-range wireless communications link 224 with a mobile device such as the mobile device illustratively shown and referenced by the numeral 226. Illustrative short-range wireless protocols include Wi-Fi, Bluetooth, and Infrared. Thus, while presentation device 210 can wirelessly interact in real time with mobile devices such as smart phones, personal data assistants, email devices, and portable media players, it does not maintain or enjoy a persistent connection to a network such as the Internet that would give it access to remote content on demand.

Figure 3:
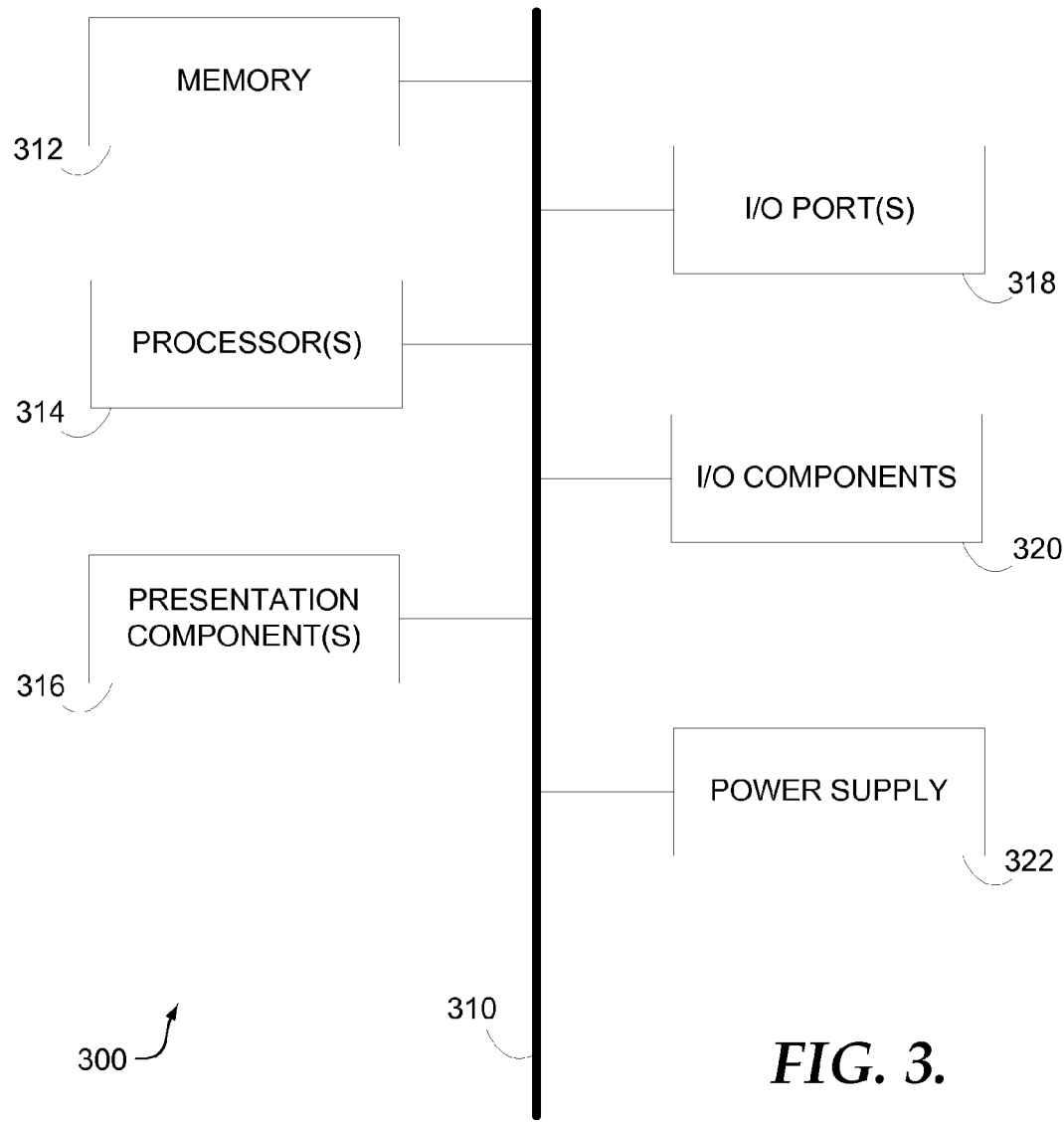
FIG. 3 is a block diagram that illustrates illustrative components of the presentation device according to an embodiment of the present invention.

In one embodiment, presentation device 210 takes the form of a mobile computing device with a small form factor. FIG. 3 depicts illustrative components that make up an embodiment of presentation device 210. With reference to FIG. 3, presentation device 300 includes a bus 310 that directly or indirectly couples the following illustrative devices (among others): memory 312 (which could include more than one memory components), one or more processors 314, one or more presentation components 316, input/output ports 318, input/output components 320, and a power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 3 is merely illustrative of an exemplary computing device that can be used in connection with one or more embodiments of the present invention.

Presentation device 300 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to store desired information and be accessed by computing device 300.

Memory 312 includes computer-storage media in the form of volatile and/or nonvolatile memory. The memory may be removable, nonremovable, or a combination thereof. Exemplary hardware devices include solid-state memory (flash memory), hard drives, optical-disc drives, etc. Computing device 300 includes one or more processors that read data from various entities such as memory 312 or I/O components 320. Presentation component(s) 316 present data indications to a user or other device. Exemplary presentation components include a display, a touch screen, a speaker, a printing component, a vibrating component, etc. I/O ports 318 allow computing device 300 to be logically coupled to other devices including I/O components 320, some of which may be built in. Illustrative components include a microphone, joystick, game pad, satellite dish, scanner, printer, wireless device, etc. Illustrative I/O ports include USB ports, IEEE 1394 ports, wireless-interfaces (infrared, Wi-Fi, Bluetooth-compatible transceivers), serial ports, parallel ports, and/or video ports, and the like.

Figure 4:
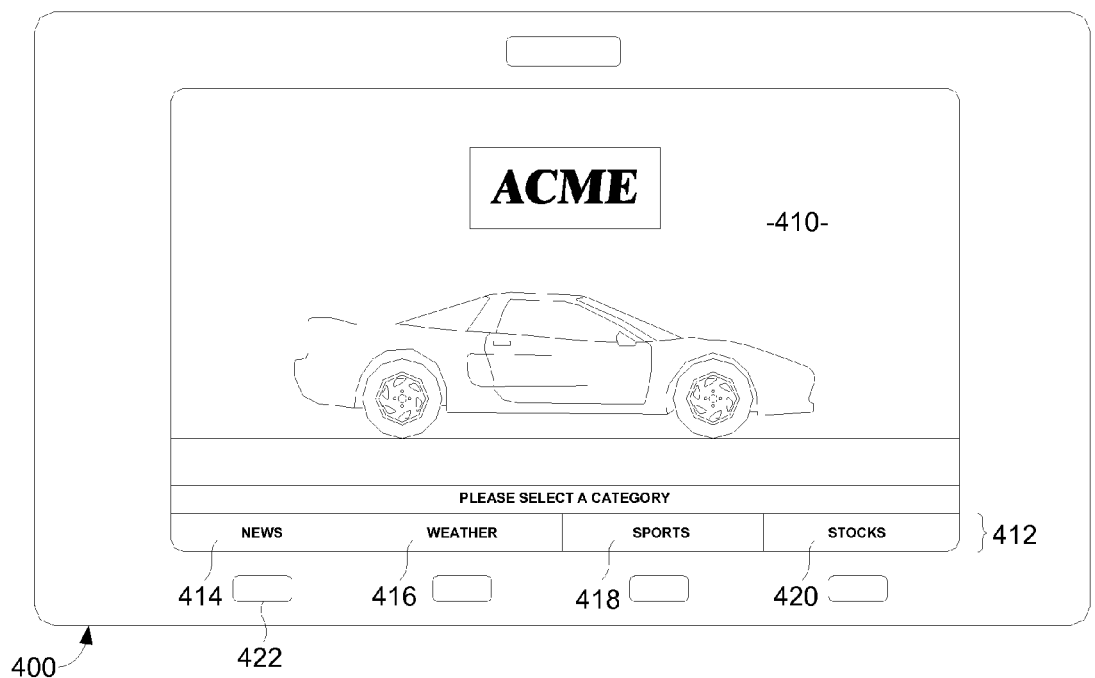
FIG. 4 depicts an illustrative home screen (or main menu) according to an embodiment of the present invention.

Turning now to FIG. 4, a version of the presentation device according to an embodiment of the present invention is provided and referenced generally by the numeral 400. FIG. 4 depicts a screenshot of an illustrative screen 410 that might be presented to a user. In one embodiment, screen 410 is a home screen, or a main screen. In some embodiments, presentation device 400 begins presenting advertisement or other media content in a manner similar to that shown. In these embodiments, advertisement data is presented that is not related to a group of selectable options, which are collectively referenced by numeral 412.

Four illustrative selectable options are shown: news 414, weather 416, sports 418, stocks 420. In one embodiment, these selectable options take the form of buttons on a touch screen that a user can select by touching. In other embodiments, hardware buttons such as button 422 (the other three are not numbered) can be used to receive an indication of a selection from the user. In still other embodiments, hardware buttons facilitate the use of soft keys, such that the hardware button 422 is mapped to the corresponding button that is being presented on user interface 410. For example, button 422 would be associated with news 414. So as to not obscure the present invention, we will generally reference "controls" by a numeral, but do not mean to exclude the fact that the controls include software buttons, hardware buttons, or combinations of the same.

One of the purposes of presenting content on interface 410 is to draw the user's attention to the device. By presenting content of interest, the device 400 draws a user to interact with it. Thus, any type of media content can be initially presented by presentation device 400. In some embodiments, this initial presentation of content is visual (textual, pictorial, video, etc.), and in other embodiments it is also, or only, audio.

In some embodiments, data is audio only so that individuals with visual impairments can still interact with presentation device 400. In such an embodiment, hardware buttons such as button 422 can be used to receive additional information associated with content that was initially presented. In other embodiments, the buttons may be fixed as associated with certain categories. In still other embodiments, the buttons may not have predefined categories, but relate to media content that is presently being presented on presentation device 400.

In some embodiments, presentation device 400 operates in one of various modes, although the term "mode" is not the best term because there are not clear delineations between the three functional environments. But for purposes of explaining various aspects of the invention, we explain that presentation device 400 (which is meant to refer to any of the aforementioned presentation devices such as those referenced by numerals 110, 120, 210, as well as others that will be mentioned later) can present an advertiser ticker, a content ticker, a static display, and combinations thereof.

Note, when we refer to a "static" display, we do not mean to refer to a stagnant display. By "static" we mean to convey that an impression (video, picture, etc.) may persist on presentation device 400 for a time, as opposed to a component such as a ticker that may persistently scroll or be in motion. We do not mean to convey by the term "static" that the items presented are fixed. To the contrary, various static displays can be dynamically presented. Thus, the displays are not stagnant. For example, a first static display may depict representation of a weather map, the next static display may present a depiction of a digital coupon, another static display may present a video, another static display may present an audio rendering, etc.

Figure 5:
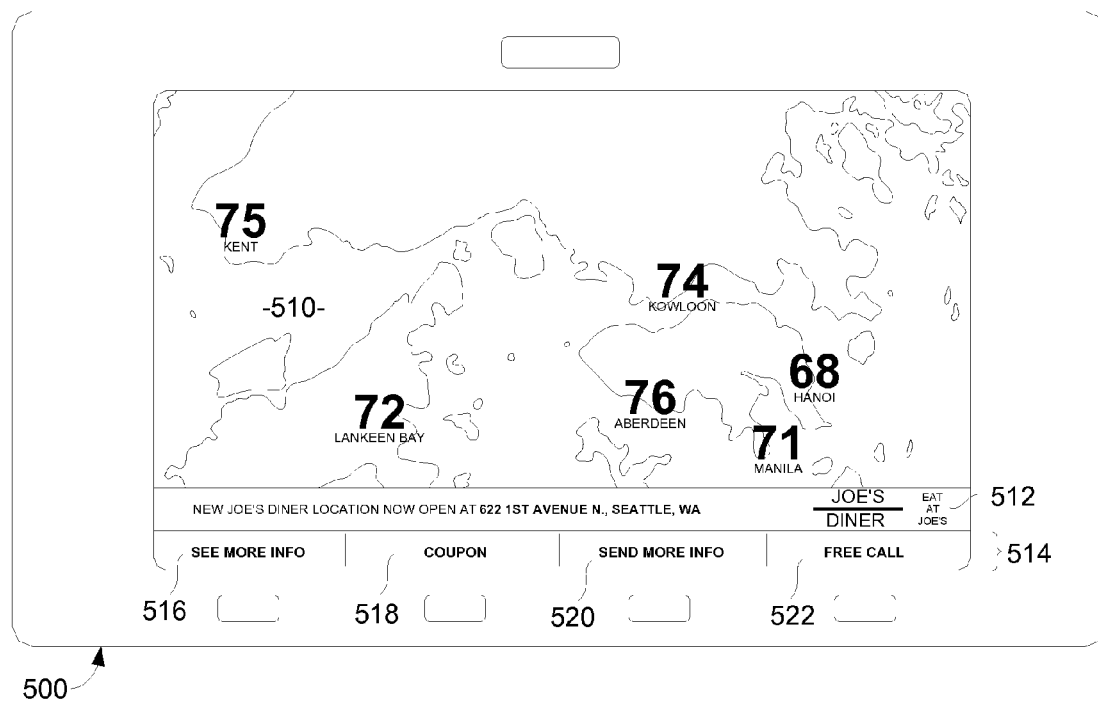
FIG. 5 depicts an illustrative screenshot that shows various aspects of an embodiment of the present invention, including a content screen, an advertisement or content ticker, and soft keys.

Turning now to FIG. 5 another illustrative representation of an embodiment of a presentation device is referenced generally by the numeral 500. Presentation device 500 includes a static-displayed portion 510, a content ticker 512 (which in some embodiments may be an advertiser ticker that is dedicated to an advertiser of choice), and an area 514 that is illustratively shown to include four selectable options. More or less than four selectable options can be presented. The four that are illustratively shown are referenced by numerals 516, 518, 520, and 522. Respectively, these controls include the text "see more info," "coupon," "send more info," and "free call." Clearly, various other labels could be used in connection with identifying selectable options, and conveying to users options that can be selected to gain additional information about something.

In the embodiment shown, ticker 512 could be an advertisement ticker or a content ticker. Clearly, these tickers may be roses that are referred to by other names. A "content" ticker need not be limited to presenting only content. An "advertisement" ticker need be limited to presenting only advertisement data. A content ticker may display information relative to the content that is branded by an advertiser. When displaying weather content, for example, the ticker may contain an ad image for sunscreen along with an expected daily high temperature for the region. If a user presses any button below the ticker, they are taken to a video ad or presented with additional information related to the advertiser in one embodiment.

An advertisement ticker allows an advertiser to purchase an entire ticker for whatever ad information they choose to display. An example of this includes scrolling a vendor's logo etc., followed by information associated with the vendor, such as information indicating that a new shop is being opened. The advertiser has the option of enabling the buttons below the display in various ways. For example, the vendor may provide options to play a video ad, print a coupon, send more information, or to call the advertiser. Building on this example, assume that a user selects the "see more info" control 516.

Figure 6:
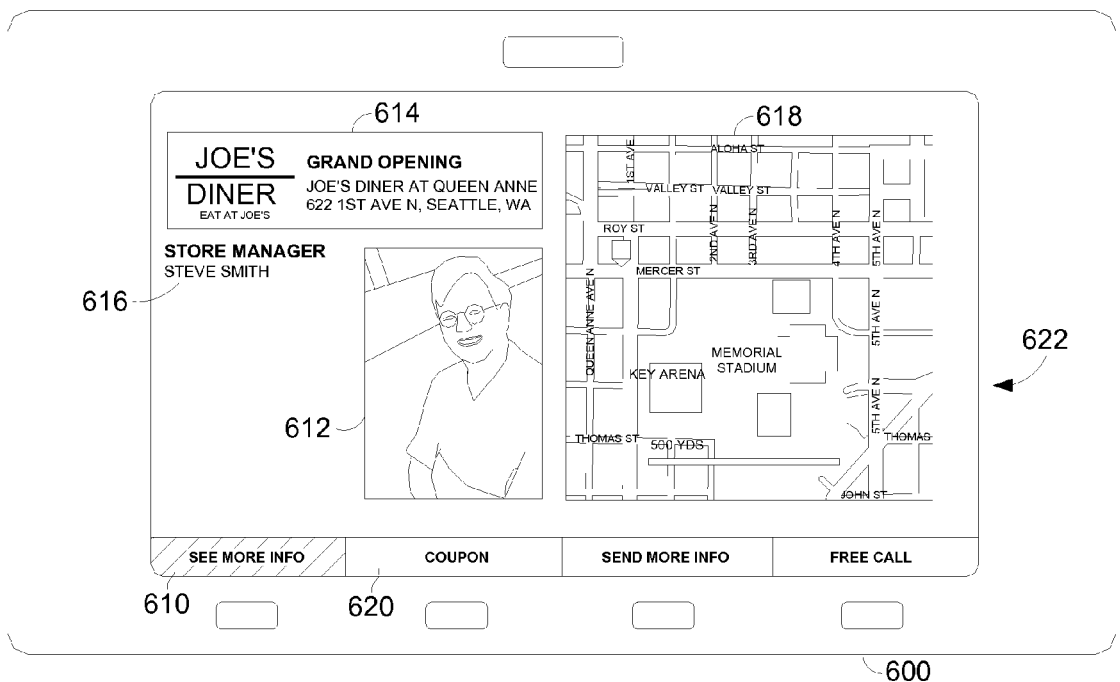
FIG. 6 depicts an illustrative screenshot of additional information being presented to a user upon request according to an embodiment of the invention.

Incident to a user selecting the "see more info" control 516, the presentation device presents additional information associated with the vendor at the time of selection, as seen in FIG. 6. FIG. 6 depicts, on the same presentation device, which is referenced by the numeral 600 for clarity, additional information associated with "Joe's Diner." In this embodiment, Joe's Diner was the subject of advertisements in FIG. 5 and at that time a user selected the "see more info" button 516. As shown in FIG. 6, the "see more info" button 610 is indicated as having been selected. In doing so, additional information such as a video 612 is presented to a user. Still further information includes contact information 614, an identification of a store manager 616, and a map 618 of the area surrounding Joe's Diner. Presentation device 600 presents more information about the advertiser and/or product that was being advertised at the time of selection. This message is controlled by the advertiser and may contain any mix of static page elements, video, audio, and the like. As previously mentioned, this advertisement could be bundled with and sold as part of a package that includes this advertisement as well as the presentation of the ticker display. Thus, the ticker was preassociated with advertisement 622 in one embodiment of the present invention. This preassociation allows packages of content to be sold so that advertisers can decide what information is to be presented to users incident to the users doing certain events.

User events are logged as they happen in one embodiment of the invention. Here, when the user selected the "see more info" control 610, that action was logged. In one embodiment, all user interaction with a presentation device is logged, and stored in a file such as data structure 222 (see FIG. 2). The more that a user interacts with the device, the more that content can be tailored to a user or set of users. In some embodiments, based on the proximity of time intervals between user interactions, content is tailored to those interactions. In other embodiments, the collective set of user interactions is utilized to determine what media content should be presented on presentation device 210.

If presentation device 210 regularly logs several indications that users are interested in sports, then it will tend to present more sports-related content in one embodiment. If users tend to be selecting the news option more often, then more static images associated with news items will be presented in one embodiment. These are examples of presentation device 210 using all of, or a collective set of, user interactions to determine what type of content to present to users. In still other embodiments, specific content is much more related to selections that occur close in time to one another, or by some other means. Another means may include an express indication of a viewing session. For example, presentation device 210 could include a way to receive an indication that a certain user is using the device, as well as an indication that that user has stopped using the device, wherein it is prepared for a new user. In the former example, advertisements or media will be presented based on that specific user's session, but not necessarily carried over to another user-interaction session.

Returning now to FIG. 6, assume that the user continues to be interested in information associated with the current vendor, which for this example is "Joe's Diner." The user may be interested in receiving a coupon that can be used at Joe's Diner. In such a situation, the user can select the "coupon" option 620 to be taken to a screen such as that shown in FIG. 7.

Figure 7:
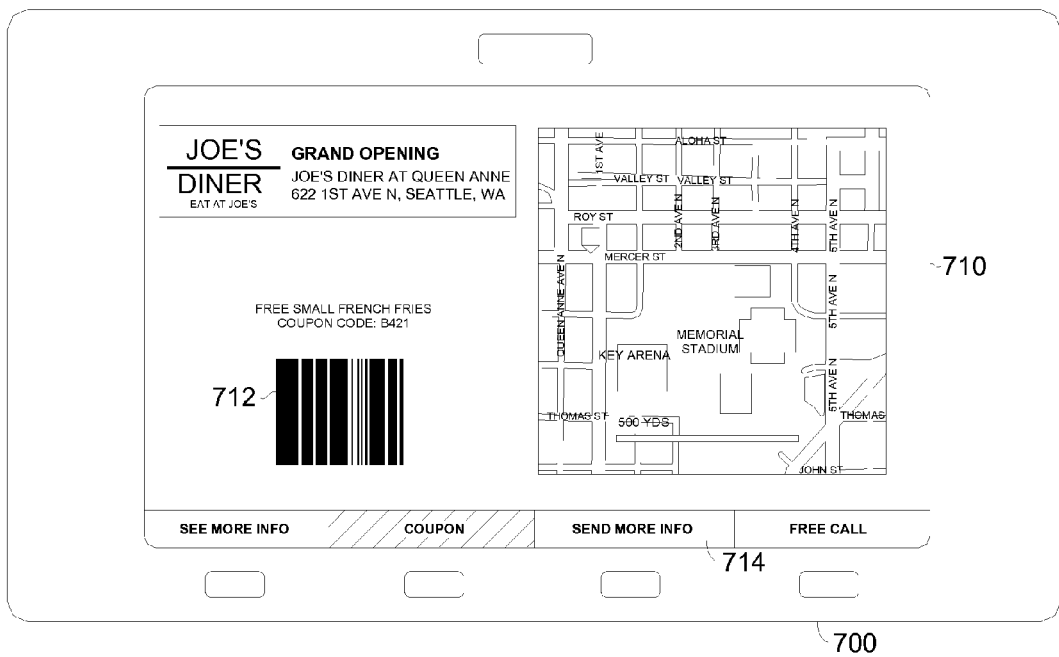
FIG. 7 depicts an illustrative digital coupon that is presentable according to an embodiment of the present invention.

Turning now to FIG. 7, an illustrative screenshot is presented on presentation device 700 and referenced generally by the numeral 710. In the example shown, a digital coupon 712 is presented on presentation device 700. The advertiser may choose to offer the viewer a coupon. In some embodiments, the viewer can take a picture of the coupon with a mobile camera and present it to a respected vendor to be used. In other embodiments, a digital code associated with the coupon can be conveyed to a user's mobile device, such as mobile device 226 (FIG. 2). In still other embodiments, a different representation, such as a bar code, can be digitally communicated to a user's mobile device 226 to maintain the fidelity of coupon 712. A user could then use this coupon at a retail location or in an online context as the case may be.

Now assume that a user is getting ready to leave the proximity of presentation device 700. In such a situation, the user may wish to receive additional information associated with a given vendor. This can be accomplished by acting on the "send more info" control 714, which presents a screen similar to the one shown in FIG. 8 in one embodiment.

Figure 8:
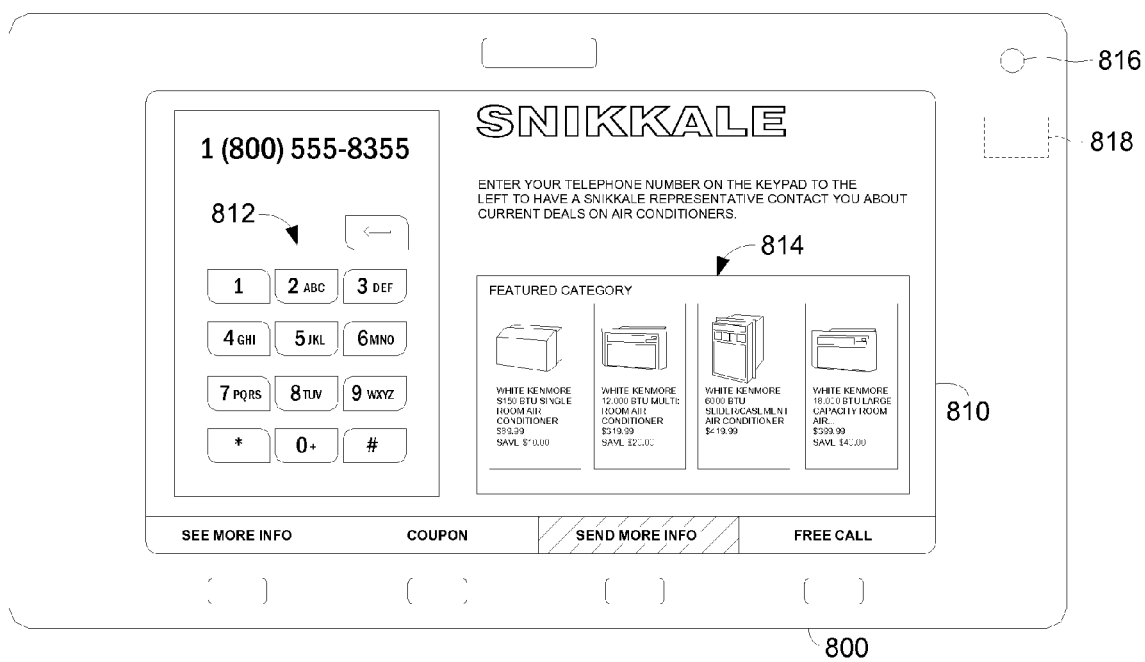
FIG. 8 depicts an illustrative screenshot providing a mechanism to send additional information to a vendor according to an embodiment of the invention.

FIG. 8 depicts a presentation device 800 as including a screen 810 that allows a user to provide contact information so that additional information about a product, service, etc., can be provided to the user at a later time. For example, a keypad 812 allows a user to enter the user's phone number, which can later be used by the vendor to send additional information to the entered number. A user may indicate one of a variety of types of products of interest as shown by numeral 814. A myriad of options exists that are not shown so as to not obscure the present invention. For example, a text box could be provided and a representation of a keyboard can be provided so that a user can key in a message that describes information of interest. In another embodiment, a user may text a message on a mobile device, and send it via short-range means 224 to presentation device 800. In still another embodiment, a microphone 816 can be utilized to receive an audible message from a user that describes what information is desired. In still another embodiment, an RFID (Radio-frequency identification) reader 818 can be provided to receive information that identifies mobile device 226 or otherwise receives contact information via an RFID-equipped mobile device. This information can be provided directly or indirectly to a vendor via link 218 (FIG. 2) that is established to synchronize with server 216. As illustratively shown in FIG. 2, a set of vendors 232 may be coupled to server 216 by way of one or more communications networks that are referenced generally by the numeral 230.

Figure 9:
FIG. 9 depicts an illustrative screenshot of one embodiment of facilitating contact with a vendor (in an embodiment where this is made possible as described below, but which is not applicable in other embodiments)

Under certain conditions, the presentation device may facilitate contacting a vendor. Turning now to FIG. 9, a presentation device 900 is depicted with a screenshot 910 that indicates a user has attempted to utilize the "free call" option that is referenced by numeral 912. This option to place a free call may not always be available to users. Moreover, it may rely on localized technology, such as Wi-Fi technology, and therefore require the proximity of a local hotspot in order to function. In other embodiments this option is not available. But in environments where it is available, a user is afforded an opportunity to speak with a representative 914 of a given vendor.

Figure 10:
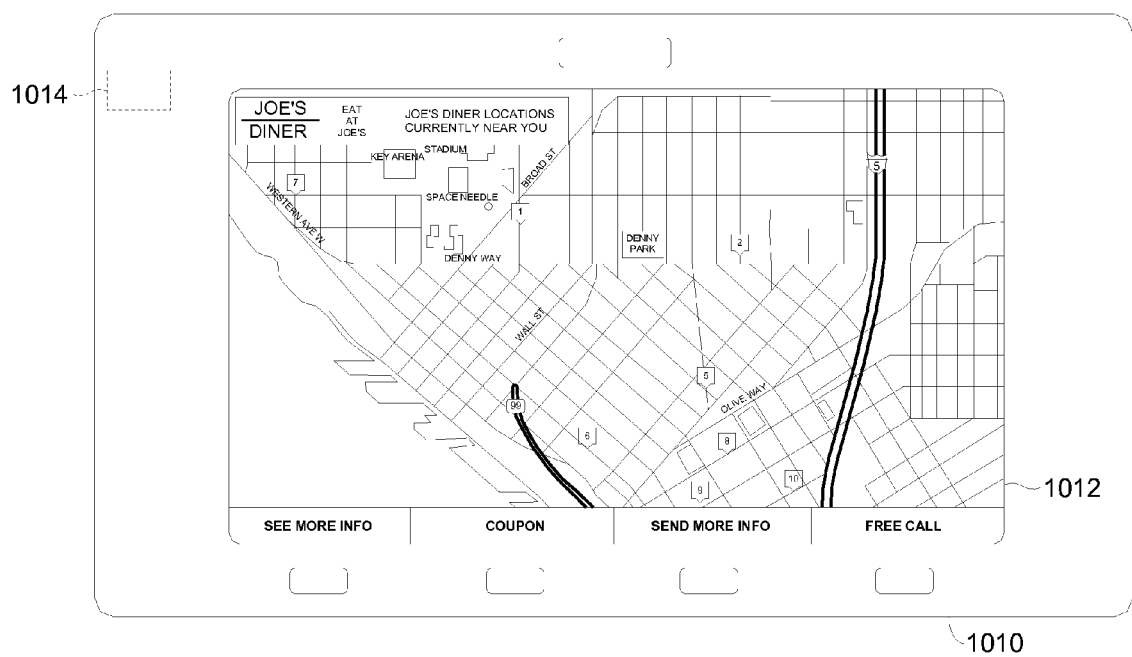
FIG. 10 depicts an illustrative screenshot of a map that can be used to provide geospatial data on the presentation device according to an embodiment of the invention.

Turning now to FIG. 10, a presentation device 1010 is shown as presenting geospatial data 1012 according to an embodiment of the present invention. In one embodiment, geospatial data 1012 is presented based on information stored in memory 312, and in other embodiments, if applicable, it can be presented after having been received by a GPS unit 1014 that is built into presentation device 1010. Geospatial data allows advertising that is relevant to a viewer's current physical location to be presented. In this way, advertisers may target users based on geographic location. It should be stressed that not all embodiments rely on GPS component 1014. Rather, locally stored geospatial information can be used to present advertisement data associated with a certain location or geographic region. For example, a set of New York City taxi cabs might present information associated with local shows and performances. If, for some reason, that taxi cab is commissioned to operate in California instead of New York, then its zip code or latitude and longitude could be provided to presentation device 1010 during an update session that occurs via communications link 218 (FIG. 2). Then, based on this new latitude and longitude data, and armed with its internally stored geospatial data, advertisements that are relevant to that geographic area can be presented, having previously been stored in a memory such as memory 312. Today, memory is cheap. We mean to convey with reference to memory component 312 both volatile and nonvolatile memory. Nonvolatile memory, such as flash memory or hard drive could easily be several tens of gigabytes, plenty enough to locally contain mapping information.

In one embodiment, presentation device 210 is fully extensible, capable of running a conventional operating system including applications associated therewith, such as mediaplayer applications and the like. Thus, a wide range of applications can be run on presentation device 210. For example, a ticketing application could be offered inside a taxi cab that would allow a user to purchase tickets for a venue while in transit. Still further, multiple-language support could allow a viewer to select content in a native language. Further still, infomercials may be designed specifically for presentation device 210 to take advantage of video hyperlinking (linking something to a video presentation). Further, Wi-Fi and Bluetooth capabilities would enable presentation device 210 to convey information to other presentation devices (not shown for clarity) in a peer-to-peer environment. Further still, for the purposes of completing a purchase, an credit-card reader 240 could allow the user to directly swipe/insert their card.

Figure 11:
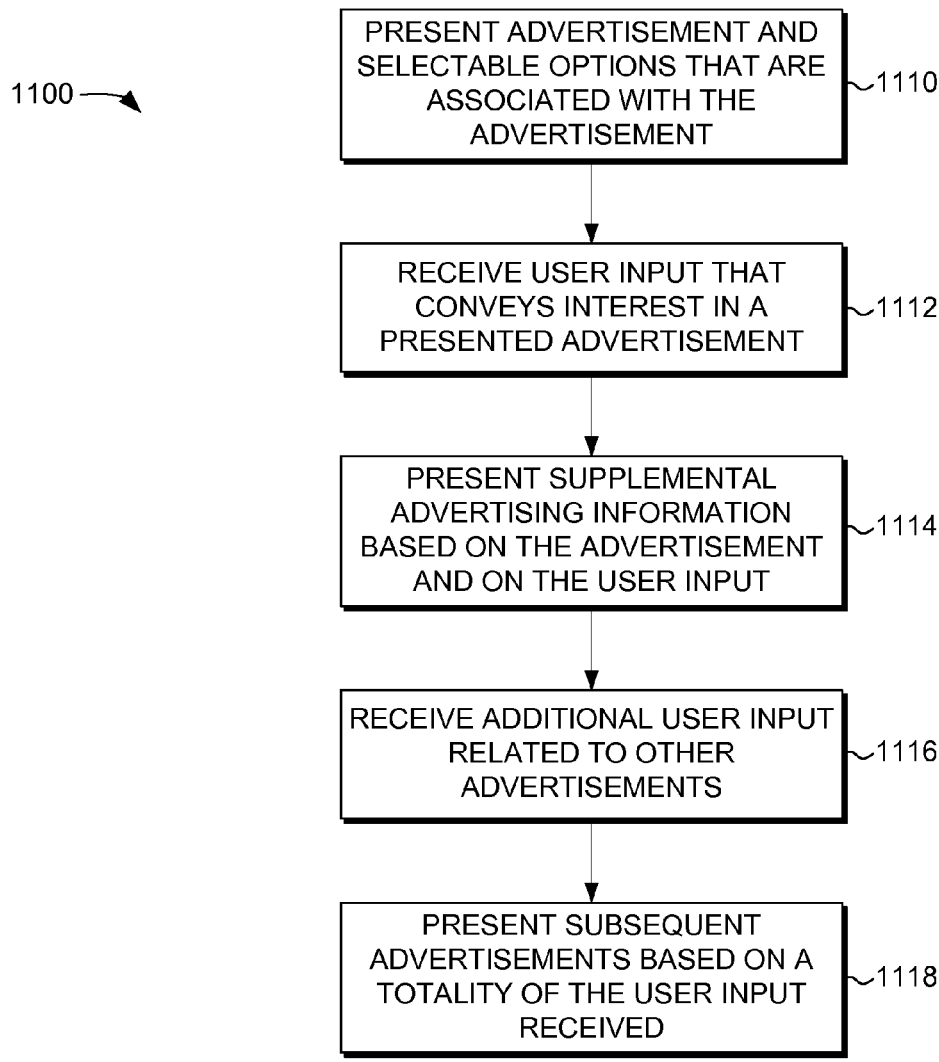
FIG. 11 is a flowchart that depicts an illustrative method of presenting advertisement data according to an embodiment of the present invention.

Turning now to FIG. 11, an illustrative method for practicing an embodiment of the present invention is provided and referenced generally by the numeral 1100. At a step 1110 one or more advertisements are presented along with selectable options that are associated with the advertisement. In some embodiments, the advertisements presented on a home or main screen are not correlated to the selectable options, such as options 412 or 514. But in other embodiments, the selectable options do correlate with an aspect of an advertisement. For example, with reference to FIG. 5, the set of selectable options 514 do relate to the advertisement in ticker 512. By way of another example, the selectable options shown in FIG. 6 (such as controls 610 and 620) relate to advertisement data 614.

At a step 1112, user input is received that conveys interest in a presented advertisement. As previously mentioned, a user can provide input in a variety of ways. We previously described several, such as clicking via a touch screen one of the controls such as those referenced by numeral 412, selecting a hardware button such as 422, and also by providing an audible form of input, or input from a device such as mobile device 226 of FIG. 2.

Many others types of input mechanisms and the like can be used in connection with different embodiments of the present invention. For example, a scale could be outfitted underneath a car or plane seat to determine a weight of a passenger. This information could then be used, alone or in connection with other information, in connection with the presentation device determining which ads from a set of ads to present. One illustrative way that this could used is to gather information of a relatively light weight, and presume that the passenger might be a child, and thus present appropriate advertising.

At a step 1114, the presentation device presents supplemental advertising information based on the advertisement and on the input. This, for example, could include presenting advertisement data 614 in response to receiving user input indicating that a user desires to see more information than that which was presented on another screen or a ticker.

At a step 1116, additional user input is received that relates to other advertisements. Thus a user may indicate other types of information of interest that are or are not related to the first advertisements. The additional user input can be inputted in the different ways mentioned, and could relate to areas different than the previously acted upon advertisements.

At a step 1118, still subsequent advertisements that are based on the totality of the user input received can be presented. Thus, even the static advertisements that are presented via the home screen can be presented based on a totality of user input received. In some embodiments, this can include the user input of a specific user during a specific session, and in other embodiments it can include user input received by a collective set of users from disparate sessions.

Figure 12:
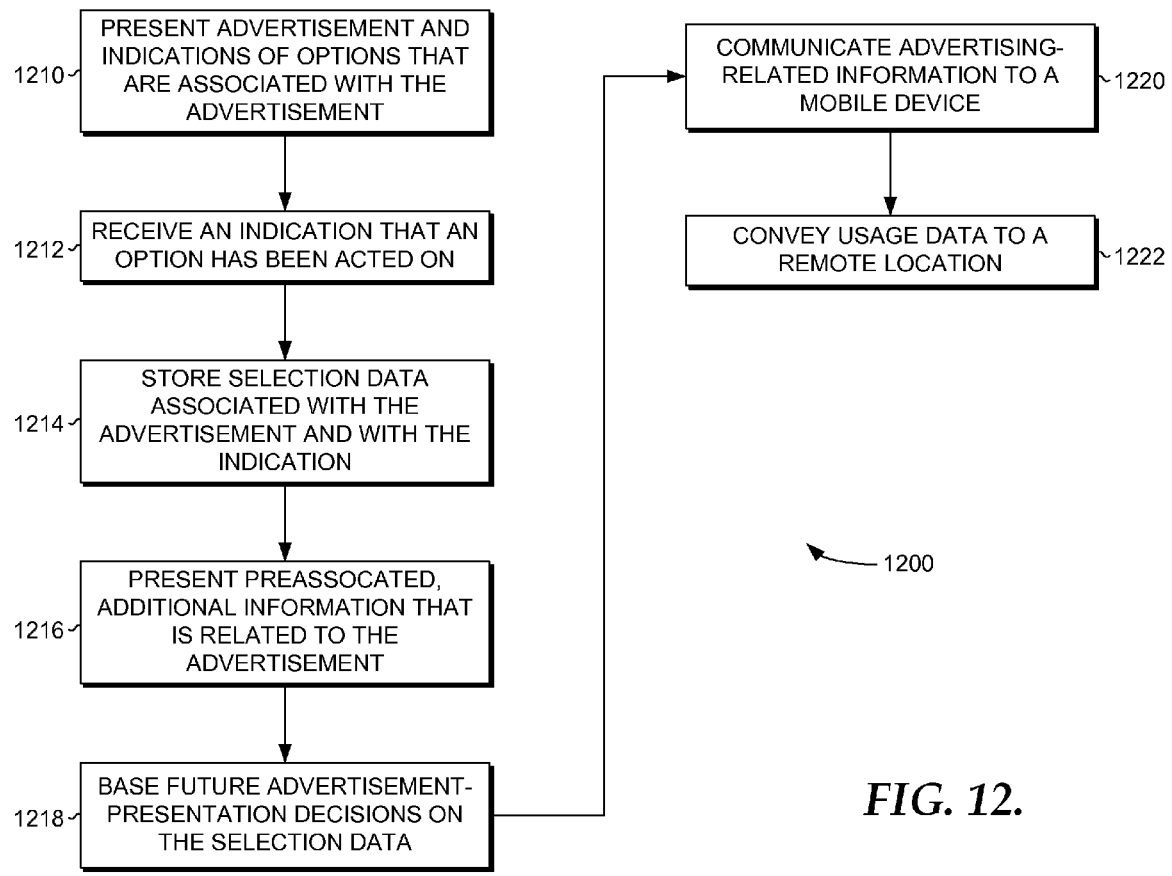
FIG. 12 is a flowchart that depicts an alternative method of presenting advertisement information and conveying usage data according to an embodiment of the present invention.

Turning now to FIG. 12, another method for practicing an embodiment of the present invention is provided and referenced generally by the numeral 1200. At a step 1210, advertisements as well as indications of options that are associated with the advertisements are presented. As previously mentioned, the advertisements may take the form of a digital picture, a digital picture that consumes a majority of an interface presented on presentation device 210, a ticker-type presentation that consumes less than a majority of the user interface but that is simultaneously viewable with other advertising content, a digital representation of a status of a real-world situation (such as weather, news, business, stocks, etc.), a digital depiction of a map, a digital depiction of information that is related to a product or a service, a digital game, a digital coupon, or variations or combinations thereof. The selectable options may be descriptive soft keys in one embodiment.

At a step 1212, presentation device 210 receives an indication that an option has been acted on. At a step 1214 selection data associated with acting on that option is stored in, for example, a memory component such as memory 312 for example.

At a step 1216, presentation device 210 presents preassociated additional information that is related to the advertisement. In one embodiment, this information is presented in response to acting on indication of options that were available to be acted on to cause the additional information to be displayed. The additional information that is stored may be of the same type as the original media information that was presented in step 1210.

At a step 1218, future advertisements are presented that are based on decisions of the selection data. In one embodiment, these future advertisements are advertisements that are associated with the advertiser originally presented. In other embodiments the future advertisements are associated with different vendors, but share some trait or quality that might make them of interest to a user based on the interactions that the user has had with presentation device 210.

At a step 1220, advertising-related information is communicated to a mobile device in one embodiment. As previously mentioned, there are a variety of types of information that can be communicated to a mobile device such as device 226 of FIG. 2.

At a step 1222, usage data is communicated to a remote location, such as to server 216 or to vendors 232. In one embodiment, the usage data is data that describes interactions between the device and users. It can be usage statistics that indicate how often and what times the device is interacted with as well as indications of button presses and mappings to advertisements associated with those button presses. These usage statistics can then be utilized by a vendor in connection with determining pricing associated with making available the potential advertisements. The more that a user interacts with a device, the more it can be determined that consumers are seeing advertisements presented on the device, and thus the more valuable an advertisement package becomes.

Figure 13:
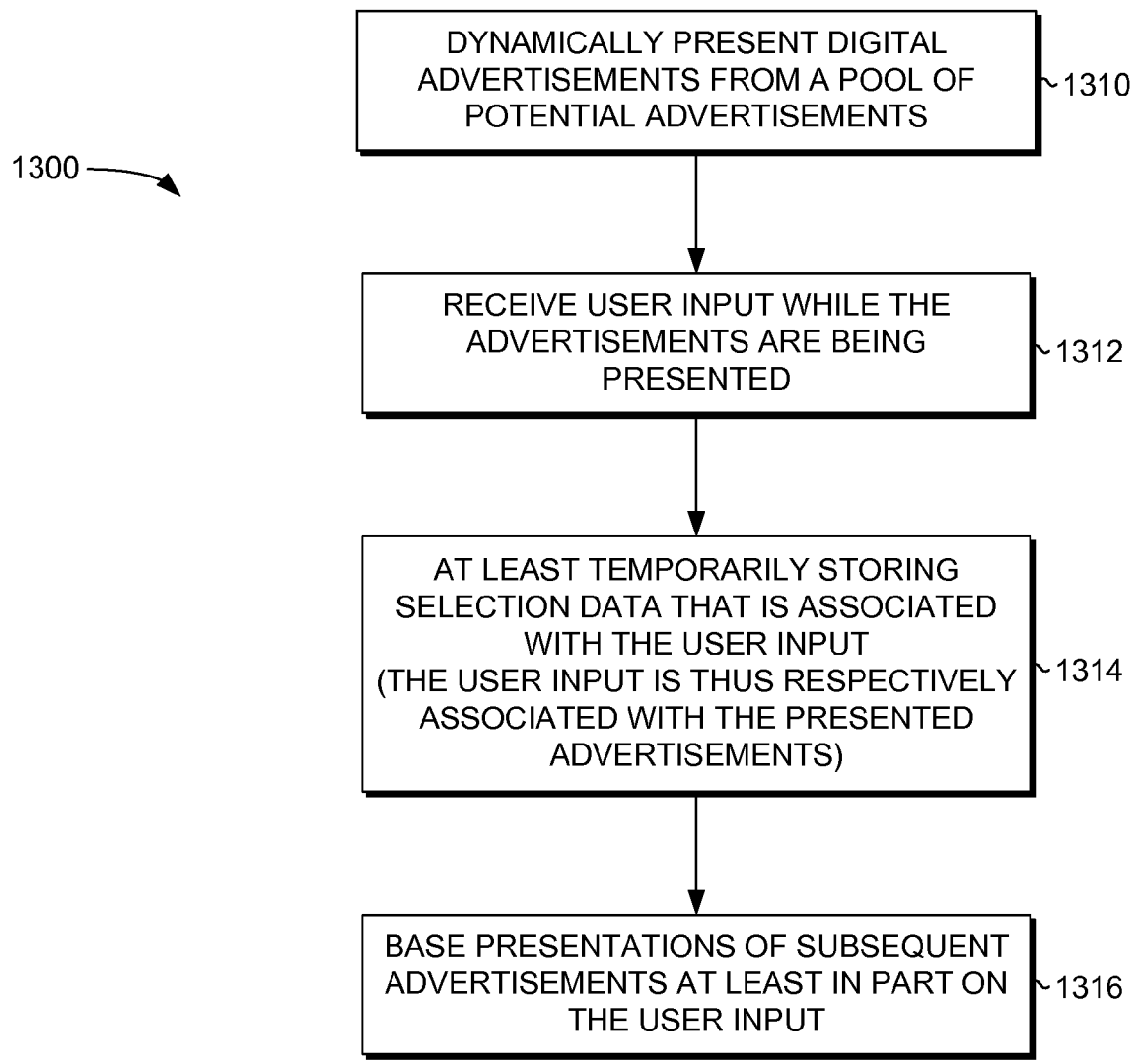
FIG. 13 is a flowchart that depicts still another illustrative method of presenting advertisement data according to an embodiment of the invention.

FIG. 13 depicts another illustrative method for practicing an embodiment of the present invention and is referenced generally by the numeral 1300. At a step 1310 digital advertisements are dynamically presented from a pool of potential advertisements. User input is received at a step 1312 while the advertisements are being presented. At a step 1314, selection data is at least temporarily stored. The selection data is data that is associated with user input, which causes user input to be respectively associated with the presenting advertisements. At a step 1316, advertisements are subsequently presented that are based at least in part on the user input.

Many different arrangements of the various components depicted, as well as components not shown, are possible without departing from the spirit and scope of the present invention.

For example, device 210 could provide directory functionality. For example, passengers cab 112 could search for a local restaurant based on cuisine, price, rating, etc. in a current location.

Further, device 210 could send information to another computer in cab 112. In this embodiment, a patron may find a desired restaurant, and wish to change destinations. Address information from the currently displayed ad could be sent to the cab's navigation system 114.

Further still, session information could be saved device 110 onto a mobile device (such as 226) and then reloaded a different device (such as 120 of FIG. 1B). A person could pick up on device 120 where [s]he left off on 110.

A video camera 242 could be incorporated into device 210 so that users could take a picture of themselves and send a digital postcard to friends and family members in some embodiments. The postcard could carry an advertiser message.

Advertisements could be provided via flash memory instead of wireless connection 218.

Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-storage media having computer-executable instructions embodied thereon for performing a method of presenting advertising content on a first presentation device that is not communicatively coupled to a source-delivery network that provides the advertising content at a time when consumers observe the advertising content, the method comprising:
   periodically establishing a temporary link to the source-delivery network;
   when the link is established, receiving the advertising content via the source-delivery network;
   storing the advertising content, wherein advertisements are stored with predetermined associations to supplemental advertising information;
   during a session with a user and while not communicatively coupled to the source-delivery network, presenting on a user interface of the first presentation device the advertisement in an electronic form that is associated with one or more selectable options that are also presented on the user interface, wherein the one or more selectable options, if selected, leads to a presentation of the supplemental advertising information that is associated with the advertisement;
   receiving user input via one of the one or more selectable options of the first presentation device;
   incident to receiving the user input, and while still not communicatively coupled to the source-delivery network, presenting the supplemental advertising information that is associated with the advertisement; and
   from the first presentation device, communicating to a mobile device via a short-range wireless communication link session data associated with the session, wherein the session data is configured to be reloaded from the mobile device onto a second presentation device, wherein the second presentation device is enabled to continue the session.

2. The media of claim 1, wherein presenting the user interface includes presenting the user interface on a touchscreen that forms part of the presentation device.

3. The media of claim 1, wherein the advertisement in electronic form includes one or more of:
   a digital picture;
   a digital picture that consumes a majority of the user interface;
   a ticker-type presentation that consumes less than a majority of the user interface and that is simultaneously viewable with other advertisement content;
   a digital depiction of a status of a real-world situation; wherein the real-world situation can include one or more of a weather situation, a news reporting, a business aspect including an asset-valuation depiction;
   a digital depiction of a map;
   a digital depiction of information related to a product or service;
   a digital game; and
   a digital coupon.

4. The media of claim 1, wherein the selectable options are descriptive soft keys.

5. The media of claim 1 wherein the supplemental advertising information includes one or more of:
   a digital-picture;
   a digital picture that consumes a majority of the user interface;
   a ticker-type presentation that consumes less than a majority of the user interface and that is simultaneously viewable with other advertisement content;
   a digital depiction of a status of a real-world situation; wherein the real-world situation can include one or more of a weather situation, a news reporting, a business aspect including an asset-valuation depiction;
   a digital depiction of a map;
   a digital depiction of information related to a product or service;
   a digital game; and
   a digital depiction of a coupon.

6. The media of claim 1, further comprising, incident to receiving the user input:
   determining selection data associated with the user input; and
   storing the selection data in a memory of the presentation device.

7. The media of claim 6, wherein the selection data includes one or more of:
   data about a current advertisement that was being displayed when the user input was received; and
   data about supplemental advertising that was presented.

8. The media of claim 7, further comprising presenting advertisements based on the selection data.

9. The media of claim 8, further comprising repeating the steps of claims 6 through 8 to still further present advertisements that are progressively more dependent on the selection data.

10. The media of claim 1, further comprising:
    logging a set of usage statistics that describe an extent to which the first presentation device has been used by various users;

communicatively coupling the first presentation device to a target destination; and communicating the usage statistics to the target destination, wherein the usage statistics can be utilized by a party in connection with determining pricing associated with presenting advertisements.

* * * * *